Patented Mar. 27, 1923.

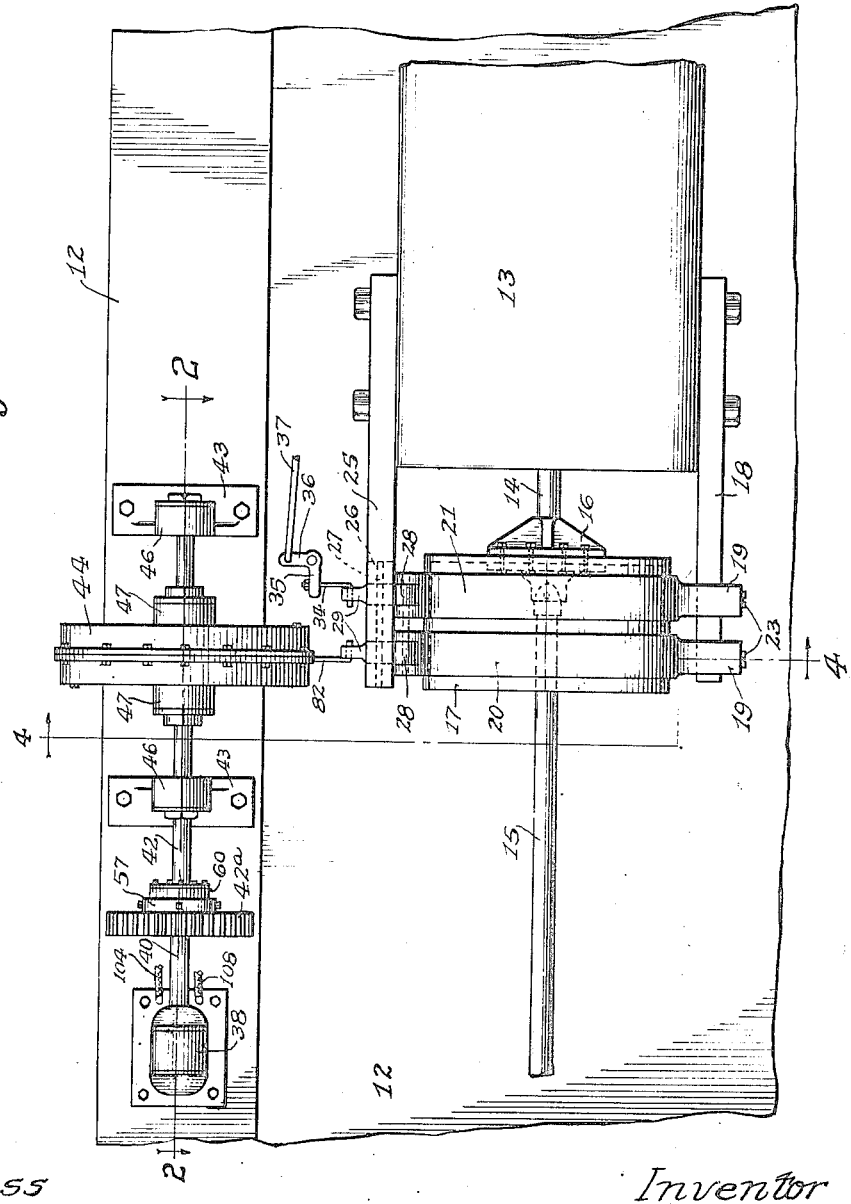

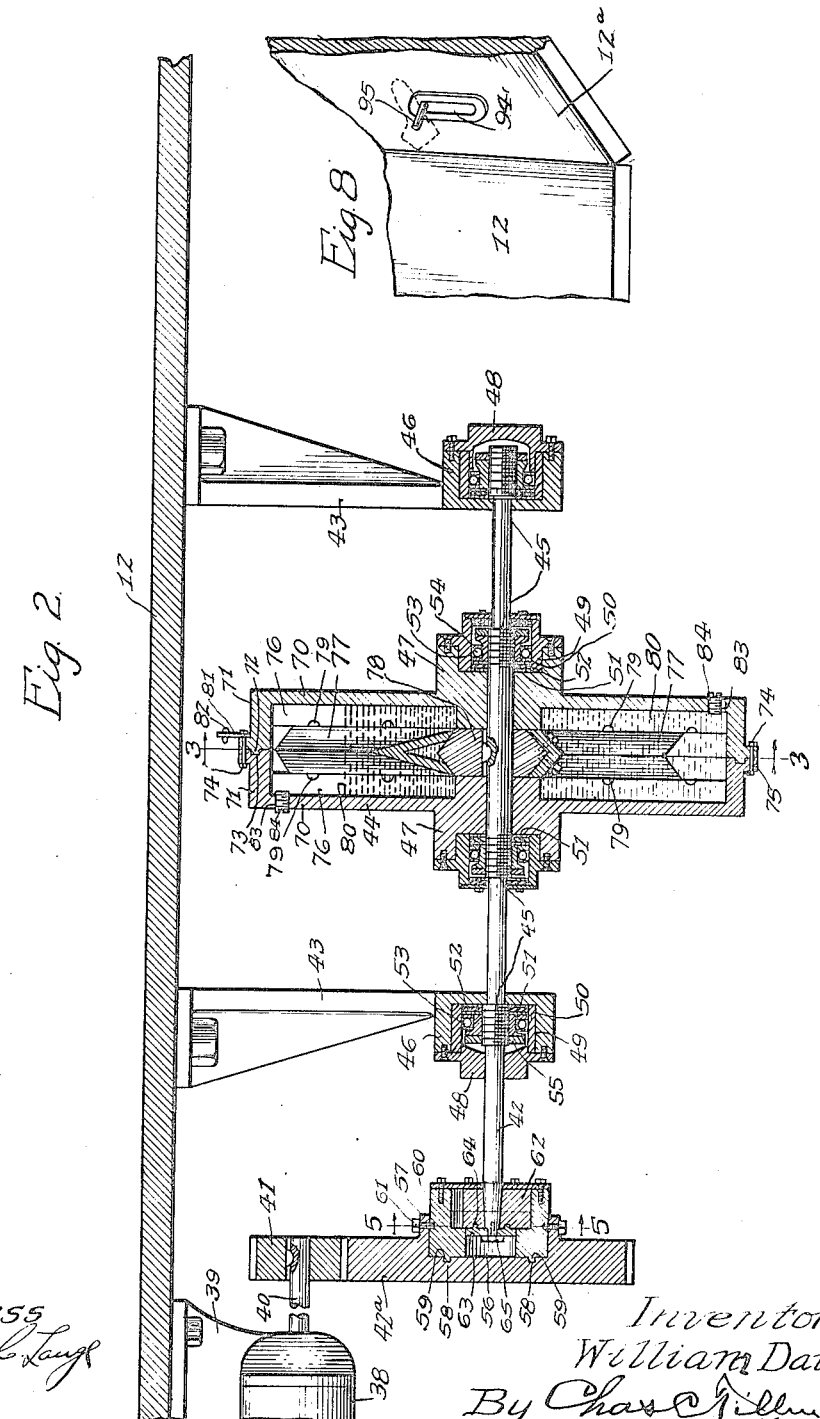

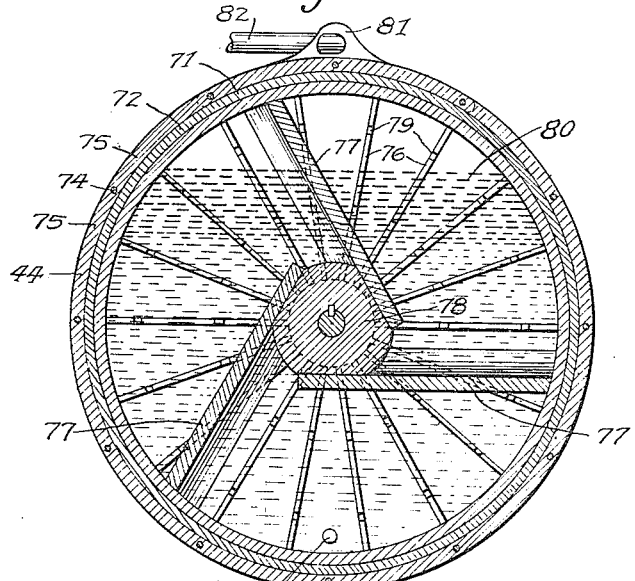
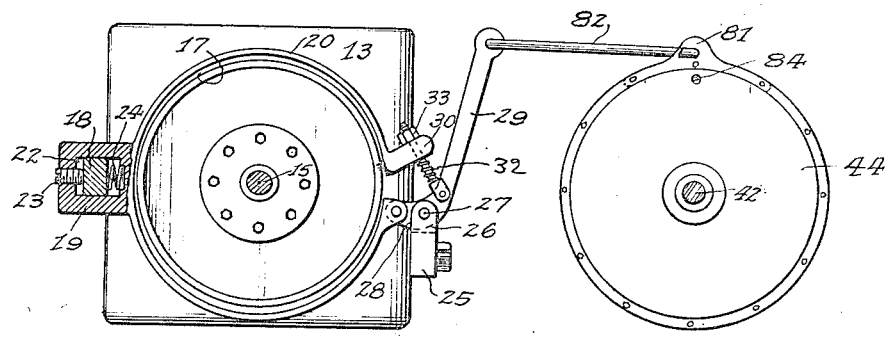
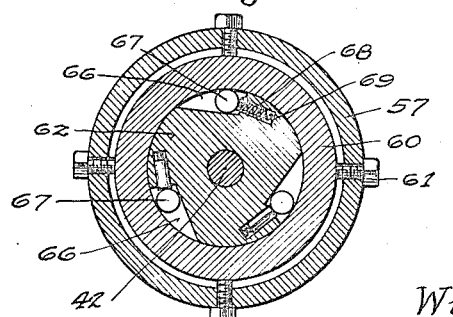

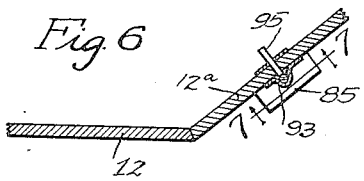
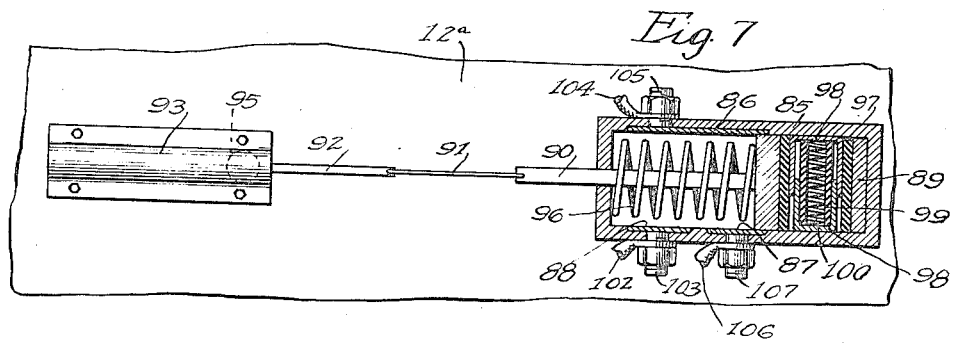
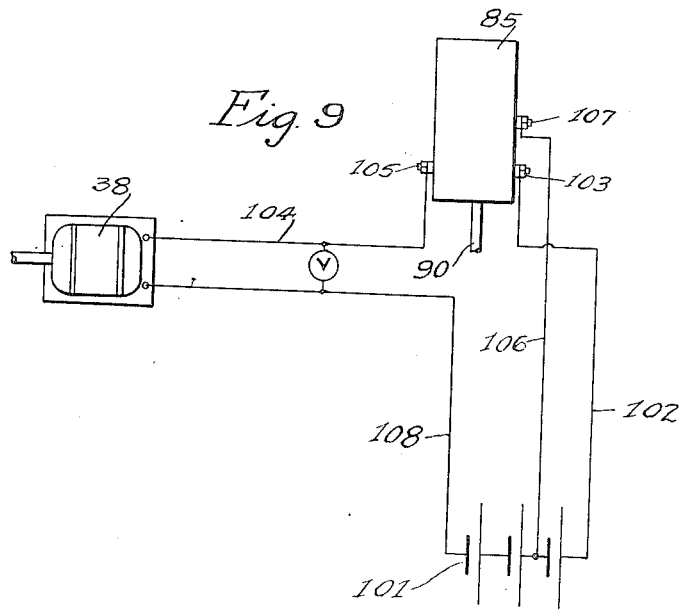

1,449,499

UNITED STATES PATENT OFFICE.

WILLIAM DAVIS, OF CHICAGO, ILLINOIS.

ELECTRICALLY-OPERATED BRAKE MECHANISM FOR AUTOMOBILES.

Application filed February 20, 1922. Serial No. 537,849.

*To all whom it may concern:*

Be it known that I, WILLIAM DAVIS, a citizen of the United States, residing at Chicago, in the county of Cook and State of Illinois, have invented certain new and useful Improvements in an Electrically-Operated Brake Mechanism for Automobiles, of which the following is a specification.

This invention relates to improvements in brake-mechanism for motor-driven vehicles, and particularly to a type of such mechanism intended for use on automobiles and in which electricity is employed for operating certain parts or elements of the apparatus, and it consists in certain peculiarities of the construction, novel arrangement and combination of the various parts thereof as will be hereinafter more fully set forth and specifically claimed.

One of the objects of the invention, is to provide an electrically operated brake mechanism for automobiles and the like, which shall be of such construction and arrangement of its parts that it shall be operable with a minimum expenditure of energy or power applied thereto by the foot, if desired, of the chauffeur or driver of the automobile, and which can be employed in conjunction with or without a brake of a well known mechanical structure, for braking or stopping the vehicle on which it is mounted.

Another object is the provision of a mechanism or apparatus of the above mentioned character, which shall be strong, durable, positive in action and highly efficient in operation, as well as, being so made as to economize in the quantity of electric energy used for operating the mechanism.

A further object is the provision in the mechanism, of means whereby the power applied to the brake-band thereof can be readily increased from that degree of power normally required, thus furnishing a unitary brake which can be used for ordinary requirements or for emergencies.

Still another and important object is to prevent injury to the electric motor employed as an element in operating the mechanism, by providing in the line of power transmission from the motor to the frictional brake-band of the device, yieldingly resisting means to co-operate with parts driven by the motor, in such a manner as to cause the brake-band to be applied to the drum with which it co-acts, with sufficient frictional stress or clamping action to stop the automobile without stopping the motor-driven shaft.

The invention contemplates, as a still further object, means for automatically releasing or relieving the brake or stress or clamping action as soon as the motor of the mechanism is de-energized; also, novel means whereby certain parts of the mechanism can be readily assembled and maintained in proper positions with respect to one another, and so that they can be more easily mounted on the automobile.

Other objects and advantages of the invention will be disclosed in the following description and explanation.

In the accompanying drawings, which serve to illustrate an embodiment of the invention—

Fig. 1 is an inverted or bottom plan view of a part of the chassis or frame of an automobile, showing parts of the mechanism mounted thereon and occupying positions with respect to one another and with respect to parts of the automobile in which they may be placed.

Fig. 2 is a slightly enlarged central vertical sectional view taken on line 2—2 of Fig. 1 looking in the direction indicated by the arrows.

Fig. 3 is a vertical sectional view taken on line 3—3 of Fig. 2 looking in the direction indicated by the arrows.

Fig. 4 is a view partly in elevation and partly in section taken on line 4—4 of Fig. 1.

Fig. 5 is a sectional view of a clutch mechanism for the motor-driven shaft or shaft which actuates the brake-band of the device through suitable connections uniting said shaft and band.

Fig. 6 is a longitudinal sectional view of a portion of the floor and foot rest of the automobile body, showing a switch mounted thereon for controlling the electric current supplied to the electric motor of the device.

Fig. 7 is an enlarged view partly in section and partly in elevation taken on line 7—7 of Fig. 6 as indicated by the arrows.

Fig. 8 is a perspective view of a similar portion of the floor and foot rest of the body of an automobile shown in Fig. 6 with a part of the electric switch mounted thereon and illustrating by dotted lines about the position the foot of the operator will initially occupy when operating the switch, and Fig. 9 is a diagrammatic view showing the electric wiring of the apparatus.

Corresponding numerals of reference refer to like parts throughout the different views of the drawings.

Referring now more particularly to Figs. 1, 2 and 7 of the drawings, the chassis or supporting frame of the automobile, which frame in the present instance includes the floor of the body of the vehicle, is designated as a whole by the reference numeral 12 and carries on its lower surface the case 13 of a transmission gear or mechanism of the ordinary or any well known construction, but which forms no part of my invention. Extended rearwardly from the transmission gear casing 13 is a transmission shaft 14 which is connected at its rear end to the front end of the rearwardly extended propeller or drive shaft 15, by means of universal coupling 16 of the ordinary or any well known construction. The rear end of the drive or propeller shaft 15 is operatively connected to the differential gearing on the rear axle of the automobile, which gearing and axle are not herein shown.

Mounted on the shaft 15 so as to turn therewith, is a brake-drum 17 which as shown in Fig. 1 is located near and rearwardly of the coupling 16, and may be of any suitable construction and dimensions. Extended rearwardly from one side of the casing 13 is a horizontally disposed bar 18 which is located parallel and in a horizontal plane with the drive shaft 15 as will be readily understood by reference to Figs. 1 and 4 of the drawings. Mounted on the bar 18 so as to permit of lateral movement thereon, are apertured bosses 19 with which the brake-band 20 of the improved brake mechanism is equipped at a point diametrically opposite its split portion, and also with which the brake-band 21 of an auxiliary brake-mechanism is equipped, which auxiliary mechanism will be hereinafter referred to.

As shown in Fig. 4, the opening 22 with which each of the bosses 19 is provided, is of sufficient size and shape to permit of some lateral movement of said bosses on the bar 18 towards and from the drum 17 and that each of said bosses has seated in its side an adjusting screw 23 to be used for adjusting the brake-bands with respect to the brake-drum. In Fig. 4 it will be observed that a coil spring 24 is located between the bar 18 and the adjacent side wall of the opening 22, and it will be understood that by turning the screw 23 in one direction, the boss 19 and the band on which it is mounted, will be moved outwardly from the drum, and by turning said screw in the opposite direction, it will be moved towards the drum. Thus it will be seen that a very simple and efficient means for adjusting the band or bands with respect to the brake-drum, is afforded. The bands 20 and 21 are alike, and each is of the split-band type. These bands are of sufficient size to encompass or surround the drum 17 without contacting therewith, but so as to closely approximate the periphery of the drum, until it is desired to apply the brake or pressure to the drum.

The transmission casing 13 has extended rearwardly from its side opposite that on which the bar 18 is mounted, another horizontally disposed bar 25 which is located slightly below the horizontal plane in which the bar 18 and drive shaft 15 is situated. The bar 25 carries on its upper surface near its rear end an upwardly extended bracket 26, in which is mounted a horizontally and longitudinally disposed rod 27 on which the shorter arm 28 of a bell-crank-lever of the improved brake mechanism is pivotally mounted. This bell-crank-lever has its longer arm 29 extended upwardly on one side of the drum 17 and is clearly shown in Figs. 1 and 4 of the drawings. The shorter arm 28 of said bell-crank-lever is pivotally connected to the lower end of the brake-band 20, and the upper end of said brake-band is provided with a foot or extension 30 disposed outwardly from the drum and provided with a transverse opening for the reception of a screw-threaded link or rod 31 which is extended through said opening in the extension 30 and pivotally connected to the longer arm 29 of the above mentioned bell-crank-lever near the shorter arm thereof.

Surrounding the rod 31 between the extension 30 on the brake-band 20 and the arm 29, is a spring 32, the tension of which can be regulated by means of a nut 33 engaging the rod 31 above the extension 30 of the brake-band. By this arrangement it is apparent that by moving the upper end of the arm 29 of the said bell-crank-lever from the drum 17 the members of the band 20 will be contracted or drawn towards each other so as to apply clamping or frictional pressure to the drum. By moving the arm 29 in the opposite direction, it is apparent that the members of the brake-band 20 will be released from the drum.

The end of the lower member of the band 21 has pivotally connected thereto the shorter arm 28 of a bell-crank-lever which arm is fulcrumed on the rod 27 carried by the bracket 26 of the supporting bar 25 and said bell-crank-lever has a longer arm 29 extended upwardly from the pivot or rod 27 and is connected to an extension 30 on the end of the upper member of the band 21 in a similar manner to that of the corresponding end of the band 20 above described. A link 34 pivotally connected at one of its ends to the upper end of the arm 29 of the bell-crank-lever which actuates the brake-band 21 and at its other end to an arm 35 of a bell-crank-lever suitably fulcrumed on the lower surface of the frame 12 or on a suitable support therefor depending from said frame. The other arm 36 of the last named bell-crank-lever has connected thereto one end of a rod 37 which leads forwardly and is connected at its front end to a brake-lever located near the seat of the driver of the machine.

Mounted on the lower surface of the chassis or frame 12 rearwardly of the brake-drum 17, and on one side thereof, is an electric motor employed for operating the brake-band of the mechanism, which motor is designated as a whole by the numeral 38 and may be supported on the frame 12 by means of a hanger 39 depending therefrom. Keyed to the motor shaft 40 is a pinion 41 which meshes with a gear 42$^a$ mounted on the rear end of the motor-driven shaft 42, or shaft which through suitable connections with the brake-band 20, serves to clamp the members of said band on the brake-drum when it is desired to stop the automobile. The motor-driven or brake-band operating shaft 42 is supported in parallelism with the drive shaft 15 and by preference at one side thereof by means of hangers 43 which are secured to the chassis or frame and depend therefrom.

As will be understood by reference to Fig. 2, the pinion 41 on the motor shaft meshes with the upper portion of the gear 42$^a$, but this arrangement is not essential, as the motor may be located at any suitable point to cause its pinion 41 to mesh with the gear 42$^a$, and in some instances the said pinion and gears may be omitted and the shaft 40 of the motor directly connected to the shaft 42 in such a way as to rotate the same. To securely hold the shaft 42 against longitudinal movement thereof in its bearings and to prevent sliding movement on said shaft of a container designated as a whole by the numeral 44 for a composition to be presently described, the shaft 42 is provided with spaced screw-threaded portions 45 which cooperate with the journal boxes 46 of the hangers 43 and with the hubs 47 of the cylindrical container 44 to prevent longitudinal movement of the shaft 42 in its bearings, and to prevent sliding movement of the container 44 on said shaft.

It will be observed that each of the journal boxes 46 has formed therein a cup-shaped cavity and that said cavities have their opposed ends closed by removable caps 48 secured by screw-bolts to the opposed faces of the journal boxes. The screw-threaded portion 45 of the shaft 42 located in each of the journal boxes, is slightly larger than the shaft 42 as shown in Fig. 2 of the drawings. The screw-threaded portions 45 of the shaft 42 located in the cavities of the hubs 47 of the container, are also slightly larger than the shaft 42 on which they are formed. To reduce friction and to absolutely prevent leakage of the composition within the container 44, anti-friction bearings and packings are provided in each of the hubs 47 of the container. Each of the hangers 43 is provided with anti-friction bearings and suitable packing, as is clearly shown in Fig. 2 of the drawings. As these bearings are practically the same in each instance, a description of one of them is deemed to suffice.

Within the cavity 49 of the box 46 or hub 47 is located an annular bushing 50 and within this bushing is vertically disposed a metal disk or washer 51 which rests against the inner surface of the upright wall of the journal box or hub. Located on the disk or plate 51 is a disk 52 of felt or similar material, and against this felt disk is located another metal member 53 which, as well as the members 51 and 52, surround the shaft 42. Anti-friction balls 54 are placed in the race or member 53 and are held against the inner surface of the bushing 50 and the race 53, by means of a truncated cone-shaped nut 55 screwed on the screw-threaded portion 45 of the motor-driven shaft. By this arrangement it is manifest that the shaft 42 will be prevented longitudinal movement in the journal boxes 46 and that the receptacle 44 will be prevented sliding movement on the said shaft, for the nuts 55 in the journal boxes will be located on opposite sides of the vertical walls of said boxes, and the nuts 55 in the cavities of the hubs 47, will be located on opposite sides of the inner faces of their cavities. The gear 42$^a$ is by preference connected to the shaft 42 by means of a clutch which will cause the shaft 42 to be rotated only when said clutch and gear are driven in one direction. In Figs. 2 and 5 the construction and arrangement of these parts are shown, and it will be observed that the gear 42$^a$ is provided centrally in one of its faces, with an annular recess 56 surrounded by a flange 57 and has in the face wall of its recess a plurality of depressions 58 to receive projections 59 on the adjacent face of an annular clutch member 60 which is fastened to the flange 57 by means of screws 61 extended through suitable openings in said flange and engaging suitable openings in the member 60. This latter member is ring-like in form and has located therein for limited movement another clutch member 62 which as shown in Figs. 2 and 5 is mounted on the tapered end of the shaft 42, which tapered portion of the shaft extends entirely through the member 62 and has mounted on its end externally of said member, a disk 63 which has on its surface adjacent the member 62, a number of projections 64 to engage corresponding recesses in the member 62. The disk 63 is held in position on the member 62 by means of a screw 65 threaded into a suitable opening in the tapered end of the shaft 42. By this arrangement it is manifest that the member 62 will be securely held on the shaft 42 against independent rotation. The member 62 as shown in Fig. 5, is provided in its periphery with a plurality of angular recesses 66, the longer walls of which are disposed tangentially with respect to the axis of said member.

Located in each of these recesses is a metal roller 67 which rollers are actuated in one direction by means of coiled springs 68 nested in suitable openings 69 leading from the shorter walls of said recesses. By this arrangement it is apparent that when the gear 42$^a$ is rotated in one direction, the rollers 67 will be caused to roll towards the acute angles of the recesses 66, thus causing clutch engagement between the member 62 and the member 60 which latter member is fixed to the gear 42$^a$, but upon movement of the said gear in the opposite direction, or of the shaft 42 in the opposite direction, the rollers will be released from their operative positions with respect to the inner and outer clutch members.

Referring now to the container which is designated as a whole by the numeral 44, and which is for the reception and retention of a quantity of a semi-fluid composition as well as for the reception and operation of rotary means for contacting and co-acting with said composition within the container for producing a yielding resistance to said rotary means, and to the rotation of the shaft 42 which actuates the brake-band of the mechanism, it will be seen and understood by reference to Figs. 2 and 3 that the container consists of a pair of substantially cup-shaped circular members 70, each provided with a centrally disposed hub 47 having centrally located openings for the reception of the shaft 42 on which shaft the container is mounted for independent rotary movement but against longitudinal movement on said shaft. Each of the members 70 has at its periphery an annular inwardly extended flange 71 and one of said flanges has at its edge adjacent the other flange a rib 72 to fit in a circular groove 73 in the adjacent edge of the other flange so as to provide a tight joint. These members are secured together by means of bolts 74 extended through transversely disposed openings in annular ribs 75 with which each of the flanges 71 is provided at their meeting edges.

Each of the members 70 is provided on its inner surface with a plurality of webs or ribs 76 which extend radially from that portion of the hubs of said members, which is located within their cavities. These inwardly extended portions of the hubs 47 are spaced from each other as is clearly shown in Fig. 2, and the adjacent edges of the webs or ribs 76 are located about flush with the inner surfaces of said parts of the hubs so as to permit of movement between the adjacent edges of the webs 76 of paddles or blades 77 which are rigidly mounted at their inner portions on a hub or wheel 78 located between the adjacent inner portions of the hubs 47 on the shaft 42 and keyed thereto. The outer ends of the blades 77 extend to the inner surfaces of the flanges 71 of the container. These blades, as shown, are substantially V-shaped in cross-section and present their apexes in the same direction, that is, in the direction in which the shaft 42 and the wheel 78 which carry said blades, rotate. The webs 76 of one of the members 70 register or coincide with the webs of the other member 70 of the container, and each of said webs has in its free edge a plurality of small recesses or notches 79, thus forming ports through which portions of the semi-fluid composition 80 will be forced in the rotation of the said blades or paddles.

Pivotally connected at one of its ends to a suitable projection 81, see Figs. 3 and 4, on the periphery of the container 44, is one end of a rod 82, the other end of which is pivotally connected to the free end of the arm 29 of the bell-crank-lever which actuates the brake-band 20 of the mechanism. The side wall of each of the members 70 of the container may be provided near its periphery with an opening 83 through which the semi-fluid material 80 in the container 44 may be supplied or discharged. A screw-plug 84 is used for closing each of these openings.

Transversely mounted on the lower surface of an upwardly and forwardly extended portion of the frame of the automobile, or rather floor of the body thereof, located in front of the driver's seat, which portion of said body is designated by the numeral 12$^a$, is an electric switch, which comprises an elongated rectangular casing 85 of fibre or other insulating material. This casing has mounted and preferably imbedded in the inner surface of one of its walls a metal contact plate 86 and mounted and preferably imbedded in the opposite wall a pair of spaced contact plates 87 and 88, which latter plates are insulated from one another by an interposed portion of the casing 85 of the switch.

Slidably mounted in the casing 85 is a block 89 which has extended from one end thereof through an opening in one end of the casing 85, a rod 90, which is connected by means of a link or rod 91, to a rod 92 extended for longitudinal movement in a guide 93 secured to the lower surface of the floor portion 12ª in alignment with the switch casing. The rod 92 has extended therefrom upwardly through a transverse slot 94 in the floor portion 12ª of the body of the automobile, a projection 95 against one side of which the foot of the chauffeur or driver may be pressed.

Surrounding the rod 90 within the switch casing and resting at one of its ends against the block 89 is a coiled spring 96 which has its other end in contact with the inner surface of that end of the casing 85 through which the rod 90 is extended. By this arrangement it is manifest that the block 89 of the switch will be normally held in its retracted position as shown in Fig. 7 of the drawings. The block 89 is provided with a transverse opening or bore in which is located a sleeve 97 of insulating material. Within this sleeve is located a pair of telescoping tubular contact members 98 each of which has its outer end closed. Within said contact members is located an insulating tube 99 which has each of its ends open and as shown, is somewhat shorter than the member 97. Within the tube 99 is located a spring 100 which serves to actuate the contact members outwardly or from each other to the end that when the block 89 is moved sufficiently against the tension of the spring 96, one of the contact members 98 will contact with the plate 86 and the other member 98 with the contact plate 87, thus completing the electric circuit from the battery 101, which may be located at any suitable point on the supporting frame, to the motor 38 through the conductors as will be presently explained. As shown in Figs. 7 and 9, an electric conductor 102 leads from one side of the battery to a binding post 103 connected to the contact plate 88 of the switch, and that a conductor 104 leads from one pole or side of the motor to a binding post 105 connected to the contact plate 86 of the switch. It will also be seen in said views that a conductor 106 leads from the battery to a binding post 107 connected to the plate 87 of the switch and that a conductor 108 leads from the opposite side or pole of the battery 101 from that of the conductor 102 to the motor. By this arrangement it is obvious that after the contact members 98 of the switch have been moved so as to contact with the plates 86 and 87, an electric circuit of sufficient voltage, say about 4 volts, will be supplied for the purpose of operating the brake-band 20 on the brake-drum 17 with sufficient stress or pressure for ordinary requirements. However, if a stronger current is required, as in the case of an emergency, the contact plates 98 of the switch may be moved to such position by pressing the projection 95 on the operating rod 92 of the switch in the proper direction, to cause them to contact with the plates 86 and 88 by which means and operation, additional voltage, of say about 2 more volts, will be supplied to the motor.

The material or composition 80 used in the container 44, is of semi-fluid character and of such nature as to be non-liquifiable and non-freezable, or non-solidifying; or in other words, is of such character as to maintain a semi-fluid nature under all circumstances. The container 44 is only partially filled with said material, but it will be understood that as the quantity of the material within the container is increased, the resistance offered by said material to the rotary blades or paddles 77 will be correspondingly increased, or if the quantity is diminished, the resistance against said members will be diminished.

The operation of the mechanism is simple and as follows:

Assuming the parts to be in the positions shown in Figs. 1, 2 and 7 and 8 of the drawings, and that the brake-band 20 is released from the drum 17 and it is desired to apply the brake, all that is necessary is to move the operating rod 92, see Fig. 7, of the switch, by the foot of the operator pressing against the projection 95 on said rod, or otherwise, from the switch, which operation will cause the contact members 98 of the switch to impinge the contact plates 86 and 87 thereof, thus completing the electric circuit and thereby causing the motor through its gearing with the motor-driven shaft 42, to rotate said shaft in such a way as to turn the paddle or blade wheel 78 in the direction of the apexes of said blades. In this rotary movement of the blades they will meet with the resistance offered by the material or composition 80 which by reason of its semi-fluid nature and by reason of its being forced through the ports 79 and between the blades 77 and webs or ribs 76, offer yielding resistance. However, this resistance will be sufficient to cause the container 44 to be rotated in the proper direction to force, through its connections 28, 29, 30, 21 and 82 with the brake-band 20, the members of said band against the drum with great pressure, or sufficient pressure to stop the automobile.

In the foregoing operation it will be understood that the motor-driven shaft 42 will not be stopped and that thus danger of burning out the motor or injury to the same will be avoided.

By employing the construction of the bearings for the motor-driven shaft 42 and for the container 44 shown in Fig. 2 and above described, it will be understood that the parts of the container are first assembled on the shaft 42, and that afterwards the hangers with their journal boxes surrounding the said shaft, are positioned thereon after which the hangers can be secured to the supporting frame. The gear 42ª and the clutch members 60 and 62 can then be positioned on the shaft 42 and this also can be done before the hangers are secured to the frame of the automobile.

By the foregoing arrangement it is apparent that this assemblage can be accomplished much more readily than if the shaft 42 was supported on the frame before the said gear and clutch mechanism and the container and its mechanism were assembled thereon. As the container is independently rotatable on the shaft 42 while the wheel 78 and its paddles or blades 77 are mounted to turn with said shaft, it is obvious that the composition or material 80 within the container will be compressed by the action of the blades against said composition to such an extent as to cause the container to be moved in the direction of the rotation of the blades or paddles 77, thus causing pressure to be applied to the brake-drum by means of the brake-band 20. As soon as the motor is de-energized by releasing the pressure against the slidable movement of the block 89 of the switch, the tension of the spring 96 in the switch casing will act against said slidable member to cause it to assume its normal position. Furthermore, as soon as the motor is deenergized the resiliency or reaction of the compression of the composition 80 will be exerted against the webs or ribs 76 of the container sufficiently to cause said container to rotate or move in the opposite direction from which it has previously been turned and thus through the connections 82 and 29 with the brake-band 20, automatically release said band or the pressure thereof from the brake-drum.

By equipping the brake-drum with the brake-band 21 in addition to the brake-band 20 of the mechanism, it will be understood that the brake-band 21 through its connections 29, 34, 35, 36, and 37, with the brake-lever of the automobile, can be used as an auxiliary braking device, or in the event of the electrically operated mechanism becoming impaired or getting out of order, the auxiliary band and its operative parts may be employed.

In the employment of a switch of the construction and operation above set forth and of the wiring employed and above described, it is apparent that a stepped or graduated switch is furnished by means of which the supply of electric energy to the motor can be regulated.

Having thus fully described my invention, what I claim as new and desire to secure by Letters Patent is—

1. In a mechanism of the class described, the combination with a driven rotary shaft, of a brake-drum mounted thereon to rotate therewith, means to apply frictional pressure to said drum, a suitably mounted electric motor, power transmission means connecting the motor and said frictional means for applying pressure to the drum and for automatically releasing said pressure upon de-energizing the motor.

2. In a mechanism of the class described, the combination with a driven rotary shaft, of a brake-drum mounted thereon to rotate therewith, means to apply frictional pressure to said drum, a suitably mounted electric motor, power transmission means connecting the motor and said frictional means for applying pressure to the drum, and yieldingly resisting means in said line of power transmission co-acting with the motor to cause sufficient pressure to be applied to the drum without stopping the motor and thereby prevent impairing the same.

3. In a mechanism of the class described, the combination with a driven shaft of an automobile, of a brake-drum mounted on said shaft to rotate therewith, means to supply frictional pressure to said drum, an electric motor suitably mounted on the frame of the automobile, a battery on said frame and in circuit with said motor, a manually operable switch on said frame in said circuit, power transmission means connecting the motor and said frictional means for applying pressure to the drum and for automatically releasing said pressure upon de-energizing the motor.

4. In a mechanism of the class described, the combination with a driven shaft of an automobile, of a brake-drum mounted on said shaft to rotate therewith, means to apply frictional pressure to said drum, means to adjust said frictional means with respect to the drum, a suitably mounted electric motor, power transmission means connecting the motor and said frictional means for applying pressure to the drum, and yieldingly resisting means in said line of power transmission co-acting with the motor to cause sufficient pressure to be applied to the drum for stopping its movement without stopping the motor.

5. In a mechanism of the class described, the combination with a driven shaft of an automobile, of a brake-drum mounted on said shaft to rotate therewith, means to apply frictional pressure to said drum, means to adjust said frictional means with respect to the drum, a suitably mounted electric motor, power transmission means connecting the motor and said frictional means for applying pressure to the drum, and yieldingly resisting means in said line of power transmission co-acting with the motor to cause sufficient pressure to be applied to the drum for stopping its movement without stopping the motor and for automatically releasing said pressure upon de-energizing the motor.

6. In a mechanism of the class described, the combination with a driven shaft of an automobile, of a brake-drum mounted on said shaft to rotate therewith, means to apply frictional pressure to said drum, an electric motor suitably mounted on the frame of an automobile, a battery on said frame in circuit with said motor, a manually operable switch on said frame in said circuit, power transmission means connecting the motor and said frictional means for applying pressure to the drum, said transmission means including a paddle wheel fixedly mounted on a shaft driven by the motor, an internally and radially webbed container encompassing said paddle wheel and mounted on the last named shaft for independent rotation and compressible semi-fluid material partially filling said container.

7. In a mechanism of the class described, the combination with a driven shaft of an automobile, of a brake-drum mounted on said shaft to rotate therewith, means to apply frictional pressure to said drum, an electric motor suitably mounted on the frame of the automobile, a battery on said frame in circuit with said motor, a manually operable stepped switch on said frame in said circuit whereby the electric energy supplied to the motor may be regulated, power transmission means connecting the motor and said frictional means for applying pressure to the drum, said transmission means including a suitably journaled shaft driven by said motor, a paddle wheel fixedly mounted on said motor driven shaft, an internally and radially webbed container encompassing said paddle wheel and mounted on the last named shaft for independent rotation, and compressible semi-fluid material partially filling said container.

8. In a mechanism of the class described, the combination with a driven shaft of an automobile, of a brake-drum mounted on said shaft to rotate therewith, a split brake-band surrounding said drum and independently mounted therefrom, means to adjust said band with respect to the drum, an electric motor suitably mounted on the frame of the automobile, a battery on said frame in circuit with said motor, a manually operable switch on said frame in said circuit, a shaft journaled on said frame near the drum and operably connected to the motor, a wheel fixedly mounted on the last named shaft, cross-sectionally V-shaped paddles mounted on said wheel tangentially with respect to its axis, a cylindrical container having on each side of the paddles a plurality of radially disposed and spaced webs and mounted on the shaft around said wheel and its paddles for independent rotation, compressible semi-fluid material partially filling said container, and means connecting the container and the members of the brake-band near their ends for actuating said members.

9. In a mechanism of the class described, the combination with a driven rotary shaft of an automobile, of a brake-drum mounted on said shaft to rotate therewith, a split brake-band surrounding said drum and independently mounted therefrom, means to adjust said band bodily with respect to the drum, a bell-crank-lever fulcrumed on the support for the band near the end of one of the members of said band and having its shorter arm pivotally connected to said end, spring-pressed adjustable means connecting the end of the other member of the band to the longer arm of said bell-crank-lever, an electric motor suitably journaled on the frame of the automobile, a battery on said frame in circuit with said motor, a manually operable switch on said frame in said circuit, a shaft journaled on said frame near the drum and operably connected to the motor, a wheel fixedly mounted on the last named shaft, paddles mounted on said wheel tangentially with respect to its axis, a cylindrical container having therein on each side of the paddles a plurality of radially disposed and spaced webs and mounted on the said shaft around said wheel and its paddles for independent rotation, compressible and expansible semi-fluid material partially filling said container, and means connecting the container and the longer arm of said bell-crank-lever for actuating the members of the brake-band.

10. A mechanism of the class described including in combination, a driven rotary shaft of an automobile, a brake-band mounted on said shaft to rotate therewith, a split brake-band surrounding said drum and independently mounted therefrom, means to adjust said band bodily with respect to the drum, a bell-crank-lever fulcrumed on the support for the band near the end of the members of said band and having its shorter arm pivotally connected to said end, spring-pressed adjustable means connecting the end of the other member of the band to the longer arm of said bell-crank-lever, and means connected to the last named arm for actuating the members of the brake-band towards and from the drum.

11. A mechanism of the class described including in combination, a driven rotary shaft of an automobile, a brake-band mounted on said shaft to rotate therewith, a pair of split brake-bands located side by side and surrounding said drum and independently mounted therefrom, means to adjust said bands bodily with respect to the drum, a pair of bell-crank levers fulcrumed on the support for said bands near the ends of one of the members of each of said bands and having their shorter arms pivotally connected to said ends, adjustable means connecting the ends of the other members of the bands to the longer arms of said bell-crank-levers, electrically operated means connected to the longer arm of one of said bell-crank-levers and manually operated means connected to said arm of the other of said bell-crank-levers.

12. A mechanism of the class described including in combination, a driven rotary shaft of an automobile, a brake-drum mounted thereon to rotate therewith, means to apply frictional pressure to said drum, an electric motor suitably mounted on the frame of the automobile, power transmission means connecting the motor and the said frictional means for applying pressure to the drum, a battery on said frame in circuit with said motor, and a manually operable stepped switch on said frame in said circuit whereby the electric energy supplied to the motor may be regulated.

13. A mechanism of the class described including in combination a motor driven shaft, a paddle wheel mounted on said shaft to rotate therewith, a container surrounding said wheel and its paddles and mounted on said shaft for independent rotary movement, said container having on each side of the paddle wheel within its cavity a plurality of radially disposed webs and semi-fluid material partially filling said container.

WILLIAM DAVIS.